United States Patent
Thoen

(10) Patent No.: US 10,079,027 B2
(45) Date of Patent: Sep. 18, 2018

(54) SOUND SIGNAL DETECTOR

(71) Applicant: NXP B.V., Eindhoven (NL)

(72) Inventor: Steven Mark Thoen, Leuven (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/172,493

(22) Filed: Jun. 3, 2016

(65) Prior Publication Data

US 2017/0352363 A1    Dec. 7, 2017

(51) Int. Cl.

| | |
|---|---|
| G10L 21/0216 | (2013.01) |
| G10L 15/30 | (2013.01) |
| G10L 25/78 | (2013.01) |
| G10L 21/0364 | (2013.01) |
| G06F 3/16 | (2006.01) |

(Continued)

(52) U.S. Cl.
CPC .......... *G10L 21/0364* (2013.01); *G06F 3/165* (2013.01); *G10L 15/08* (2013.01); *G10L 15/32* (2013.01); *G10L 21/0208* (2013.01); *G10L 21/0356* (2013.01); *G10L 25/51* (2013.01); *G10L 25/84* (2013.01); *H04R 1/1041* (2013.01); *H04R 3/005* (2013.01); *G10L 15/30* (2013.01); *G10L 2015/223* (2013.01); *G10L 2021/02166* (2013.01); *G10L 2025/783* (2013.01); *H04R 1/326* (2013.01); *H04R 2430/20* (2013.01); *H04R 2460/03* (2013.01)

(58) Field of Classification Search
CPC .......... G10L 2021/02166; G10L 15/30; G10L 2025/783
See application file for complete search history.

(56) References Cited

U.S. PATENT DOCUMENTS 6,594,630 B1    7/2003    Zlokarnik et al.
8,948,415 B1 *  2/2015    Reid ................. H04W 52/0238
                                                381/94.1

(Continued)

FOREIGN PATENT DOCUMENTS

WO    WO-03/083828 A1    10/2003
WO    WO-2015/092401 A2    6/2015

OTHER PUBLICATIONS

NXP B.V., Thoen, Steven Mark; "U.S. Appl. No. 15/173,138, not yet published"; 34 pages (Jun. 3, 2016).

(Continued)

*Primary Examiner* — Richemond Dorvil
*Assistant Examiner* — Bryan S Blankenagel

(57) ABSTRACT

One example discloses an apparatus for sound signal detection, comprising: a first wireless device including a first pressure sensor having a first acoustical profile and configured to capture a first set of acoustic energy within a time window; wherein the first wireless device includes a wireless signal input; wherein the first wireless device includes a processing element configured to: receive, through the wireless signal input, a second set of acoustic energy captured by a second pressure sensor, having a second acoustical profile, within a second wireless device and within the time window; apply a signal enhancement technique to the first and second sets of acoustic energy based on the first and second acoustical profiles; search for a predefined sound signal within the enhanced sets of acoustic energy; and initiate a subsequent set of sound signal detection actions if the search finds the sound signal.

13 Claims, 5 Drawing Sheets

(51) Int. Cl.

| | | |
|---|---|---|
| *G10L 21/0356* | (2013.01) | |
| *G10L 25/51* | (2013.01) | |
| *G10L 25/84* | (2013.01) | |
| *G10L 15/08* | (2006.01) | |
| *H04R 1/10* | (2006.01) | |
| *H04R 3/00* | (2006.01) | |
| *G10L 15/32* | (2013.01) | |
| *G10L 21/0208* | (2013.01) | |
| *H04R 1/32* | (2006.01) | |
| *G10L 15/22* | (2006.01) | |

(56) References Cited

U.S. PATENT DOCUMENTS

| | | | | |
|---|---|---|---|---|
| 2007/0076910 | A1* | 4/2007 | Sporer | H04R 25/453 381/312 |
| 2009/0220107 | A1* | 9/2009 | Every | G10L 21/0208 381/94.7 |
| 2009/0238377 | A1 | 9/2009 | Ramakrishnan et al. | |
| 2009/0298428 | A1* | 12/2009 | Shin | H04W 76/15 455/41.2 |
| 2010/0130198 | A1 | 5/2010 | Kannappan et al. | |
| 2011/0058676 | A1* | 3/2011 | Visser | 381/17 |
| 2011/0208520 | A1* | 8/2011 | Lee | G10L 25/78 704/233 |
| 2012/0128186 | A1* | 5/2012 | Endo | H04R 25/407 381/313 |
| 2012/0185247 | A1* | 7/2012 | Tzirkel-Hancock | G10L 21/0208 704/233 |
| 2013/0089039 | A1* | 4/2013 | Vashi | H04W 72/02 370/329 |
| 2013/0202068 | A1* | 8/2013 | Ly-Gagnon | H04W 52/0225 375/343 |
| 2013/0208896 | A1* | 8/2013 | Chatlani | H04R 25/407 381/17 |
| 2013/0226324 | A1* | 8/2013 | Hannuksela | H04S 7/30 700/94 |
| 2014/0219484 | A1 | 8/2014 | Zellner | |
| 2014/0229184 | A1* | 8/2014 | Shires | H04L 12/12 704/275 |
| 2014/0270287 | A1* | 9/2014 | Park | H04M 1/7253 381/313 |
| 2014/0274203 | A1* | 9/2014 | Ganong, III | H04W 52/0251 455/556.1 |
| 2014/0278394 | A1* | 9/2014 | Bastyr | G10L 21/0208 704/233 |
| 2014/0278435 | A1 | 9/2014 | Ganong, III et al. | |
| 2014/0369537 | A1* | 12/2014 | Pontoppidan | H04R 25/00 381/314 |
| 2015/0036856 | A1* | 2/2015 | Pruthi | G06F 3/04842 381/317 |
| 2015/0078600 | A1* | 3/2015 | Rasmussen | H04R 25/405 381/318 |
| 2015/0088501 | A1* | 3/2015 | Recker | H04R 25/43 704/235 |
| 2015/0120299 | A1* | 4/2015 | Thomsen | G10L 15/22 704/246 |
| 2016/0044151 | A1* | 2/2016 | Shoemaker | H04M 19/04 455/556.1 |
| 2016/0070533 | A1* | 3/2016 | Foster | G06F 3/167 704/275 |
| 2016/0127600 | A1* | 5/2016 | Beatty | H04N 1/327 358/1.15 |
| 2016/0278160 | A1* | 9/2016 | Schliwa-Bertling | H04W 48/02 |

OTHER PUBLICATIONS

Wikipedia; "Beamforming"; retrieved from the internet https://en.wikipedia.org/wiki/Beamforming; 6 pages (Jun. 3, 2016).

Hunn, Nick; "The Market for Smart Wearable Technology—A Consumer Centric Approach"; retrieved from the internet Apr. 28, 2016 http://www.nickhunn.com/wp-content/uploads/downloads/2015/07/The-Market-for-Smart-Wearables-Feb-2015-3rd-Edition-rev2.pdf; 63 pages (Feb. 2015).

NXP; "NXP and BRAGI Demonstrate World's First Smart, Truly Wireless Earphones at CES"; Press release, Las Vegas, NV, US Jan. 6, 2016, Globe Newswire; retrieved from the internet https://globenewswire.com/news-release/2016/01/06/799852/0/en/NXP-and-BRAGI-Demonstrate-World-s-First-Smart-Truly-Wireless-Earphones-at-CES-2016.html Apr. 28, 2016; 4 pages (2016).

NXP; "NXP Announces Ultra-Low Power Radio Transceiver Enabling Truly Wireless Earbuds"; Press Release retrieved from the internet Apr. 28, 2016 https://globenewswire.com/news-release/2015/02/26/710225/10122169/en/NXP-Announces-Ultra-Low-Power-Radio-Transceiver-Enabling-Truly-Wireless-Earbuds.html; 3 pages (Feb. 26, 2015).

NXP; "NXP NFMI radio NxH2280—NFMI radio for wireless audio and data streaming"; retrieved from the internet Apr. 28, 2016 http://www.nxp.com/documents/leaflet/75017645.pdf; 2 pages (2015).

* cited by examiner

SOUND SIGNAL DETECTOR

The present specification relates to systems, methods, apparatuses, devices, articles of manufacture and instructions for sound signal detection.

SUMMARY

According to an example embodiment, an apparatus for sound signal detection, comprising: a first wireless device including a first pressure sensor having a first acoustical profile and configured to capture a first set of acoustic energy within a time window; wherein the first wireless device includes a wireless signal input; wherein the first wireless device includes a processing element configured to: receive, through the wireless signal input, a second set of acoustic energy captured by a second pressure sensor, having a second acoustical profile, within a second wireless device and within the time window; apply a signal enhancement technique to the first and second sets of acoustic energy based on the first and second acoustical profiles; search for a predefined sound signal within the enhanced sets of acoustic energy; and initiate a subsequent set of sound signal detection actions if the search finds the sound signal.

In another example embodiment, the processing element is configured to search for the predefined sound signal in the first set of acoustic energy, before receiving the second set of acoustic energy and before searching for the predefined sound signal within the enhanced sets of acoustic energy.

In another example embodiment, the second set of acoustic energy is not received until the first wireless device requests transfer of the second set of acoustic energy; and the first wireless device is configured to request transfer of the second set of acoustic energy in response to the processing element detecting the predefined sound signal in the first set of acoustic energy.

In another example embodiment, the processing element is configured to: calculate a probability that the first set of acoustic energy received within the time window includes the predefined sound signal and only requests transfer of the second set of acoustic energy if the calculated probability is above a predetermined threshold probability.

In another example embodiment, a voice activity algorithm enables the search for the predefined sound signal.

In another example embodiment, the predefined sound signal includes at least one of: a voice command, an authorized voice signature, child crying, an environmental sound, a breaking glass sound, a dripping water sound, a fire alarm sound or a combustion sound.

In another example embodiment, further comprising: the second wireless device, wherein the second wireless device is configured to be separated from the first wireless device by a predetermined distance.

In another example embodiment, the set of wireless devices are configured to be separated by the predetermined distance within at least one of: an indoor environment, a home, an office, a subway, a vehicle, a car, a train, a plane, or an outdoor environment.

In another example embodiment, the first wireless device is configured to receive the second set of acoustic energy encoded within a near-field magnetic induction (NFMI) signal.

In another example embodiment, the wireless devices include at least one of: a microphone, an earbud, a hearable, a smartphone, a smartwatch, a wearable device, a tablet or a computer.

In another example embodiment, the set of sound signal detected actions include transitioning the wireless device from a standby mode to an operational mode in response to finding the predefined sound signal.

In another example embodiment, the set of sound signal detected actions further include, if the signal enhanced sets of acoustic energy included the predefined sound signal, then initiating a wireless connection to a sound signal processing server to further analyze the signal enhanced sets of acoustic energy for specific sound signals, voice commands, words, sounds, or speech phrases.

In another example embodiment, the first pressure sensor is configured to receive the acoustic energy via a passage coupling an internal portion of the wireless device to an external ambient environment.

In another example embodiment, the signal enhancement technique is a beamforming technique; and the acoustic energy includes noise and the beamforming technique distinguishes the noise from the sound signal.

According to an example embodiment, an apparatus for sound signal detection, comprising: a first wireless device including a first pressure sensor configured to capture a first set of acoustic energy within a time window; a second wireless device including a second pressure sensor configured to capture a second set of acoustic energy within the time window; and a third wireless device including a processing element configured to: request transfer of the first set of acoustic energy captured by the first pressure sensor within the first wireless device and within the time window; request transfer of the second set of acoustic energy captured by the second pressure sensor within the second wireless device and within the time window; apply a signal enhancement technique to the first and second sets of acoustic energy; search for a predefined sound signal within the signal enhanced sets of acoustic energy; and initiate a set of sound signal detected actions if the search finds the predefined sound signal.

According to an example embodiment, an article of manufacture including at least one non-transitory, tangible machine readable storage medium containing executable machine instructions for sound signal detection: wherein the article includes, a wireless device including a pressure sensor, having a first acoustical profile, and configured to capture a first set of acoustic energy within a time window, and a processing element configured to execute the instructions; and wherein the instructions include, receiving a second set of acoustic energy captured by a second pressure sensor, having a second acoustical profile, within a second wireless device and within the time window; applying a signal enhancement technique to the first and second sets of acoustic energy based on the first and second acoustical profiles; search for a predefined sound signal within the enhanced sets of acoustic energy; and initiate a subsequent set of sound signal detection actions if the search finds the sound signal.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings, in which:

Figure 1:
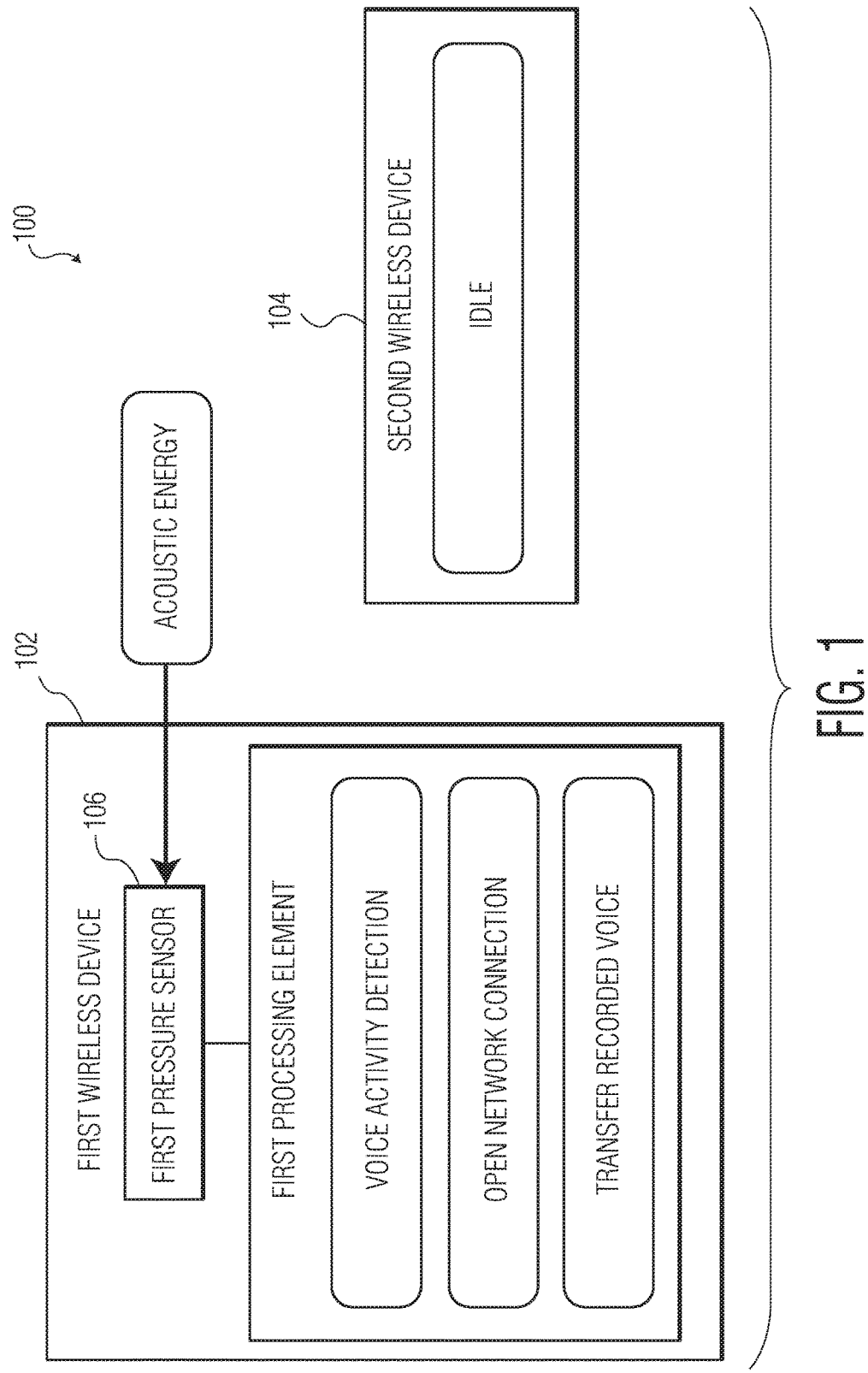
FIG. 1 is a first example apparatus for sound signal detection.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices, such as wireless earbuds (also known as Hearables), in various embodiments include embedded sound and sensor capabilities. Such wireless devices can be designed to support playback of stereo sound from an external device such as a cellphone, making phone calls, responding to voice commands, detecting sound events, and so on.

Some example embodiments communicate with a smartphone or other devices, such as tablet, computers, etc., through Bluetooth Classic or through Bluetooth Low Energy (BLE), and communicate with each other using Near-Field Magnetic Induction (NFMI) signals that can pass through various structures, including the human body, and in the case of hearables, through the human head.

One example embodiment for such wireless devices is voice recognition by a set of wearable earbuds. When a single microphone at one earbud (e.g. a single-sided microphone) is used to pick up the voice of the wearer, sound quality is limited since the single-sided microphone is not be directional and stray environmental noise can obfuscate the desired speech signal.

Another example embodiment may use two microphones in a single earbud device in an attempt to improve the directionality of the combined microphone signal, suppress environmental noise and increase the level of the speech signal. However, due to close proximity of such microphones, the amount of achievable environment noise suppression is limited.

Effective voice and sound signal recognition can help improve speech recognition, voice communications, voice commands (e.g. waking-up the wireless device), and alarm generation (e.g. a home security system that recognizes the sound of glass breaking). Many voice and sound signal recognition programs also connect to a more computationally powerful remote server for more effectively decoding a voice or other sound signal so as to perform various speech and sound signal recognition functions.

FIG. 1 is a first example apparatus 100 for sound signal detection. The first apparatus 100 shows a single-sided sound signal detection apparatus that includes: a first wireless device 102 (e.g. left earbud, master earbud, etc.) and a second wireless device 104 (e.g. right earbud).

In single-sided voice activation, the first wireless device 102 (e.g. master earbud) includes a connection to a cloud network, through a smartphone or other device and performs voice activation based on a first pressure sensor 106 (e.g. local microphone) signal.

In one example, voice activation of and/or speech recognition within the first apparatus 100 is achieved using a power-optimized, multi-stage process where initially the first wireless device 102 (e.g. master earbud) aims to individually detect acoustic energy and then gradually apply more computational processing power to ensure that the detected sound is effectively a voice signal emanating from its wearer (i.e. voice activity detection).

Once the first wireless device 102 (e.g. master earbud) decides it has correctly detected voice activity from its wearer, it will start to forward the assumed speech information and/or voice commands (i.e. transfer recorded voice) to the cloud network (i.e. open network connection). The processing in the cloud network then aims to further interpret the meaning and intent of the recorded speech information and/or voice command. The right earbud 104 is passive during this whole voice activation of and/or speech recognition process.

In one example of the first wireless device 102 (e.g. master earbud) in the first apparatus 100 uses an external microphone (i.e. the first pressure sensor 106) to listen for a user's voice. The external microphone however can pick up a lot of interfering sounds and other voices from the surroundings. This setup can lead to a lot of false voice activation triggers and/or garbled speech recognition results, thereby wasting energy and time as false speech signals and/or commands are now transferred to the cloud for further analysis. Additionally, with a single external microphone, the quality of the recorded voice of the wearer (even when correctly detected and recorded) is still very susceptible to background and other interfering sounds which are also recorded and difficult to remove effectively.

In another example of the first wireless device 102 (e.g. master earbud) in the first apparatus 100 uses an internal microphone (i.e. the first pressure sensor 106) wholly located within the master earbud 102 to listen for a user's voice. In this case, while the internal microphone can be well isolated from surrounding noise sources (assuming a tight fitting earbud) and may not pick up a lot of interfering sounds and other voices from the surroundings, the microphone's signal is further attenuated and a user's high frequency speech content tends to be missing. Use of an internal microphone also can pick up unwanted interference when music or speech is played back through the first wireless device's 102 (e.g. master earbud's) speaker.

Figure 2A:
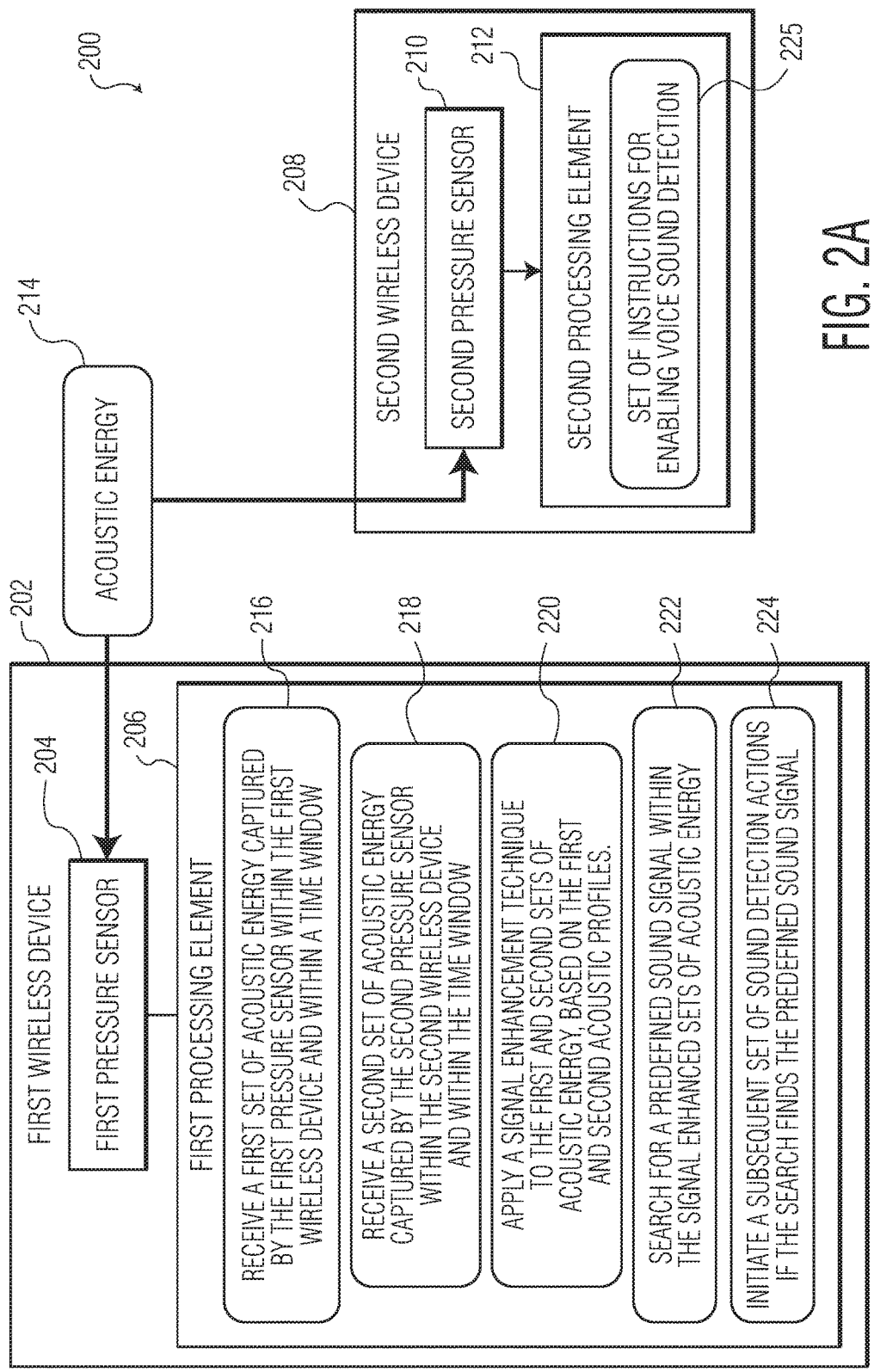
FIG. 2A is a second example apparatus for sound signal detection.

FIG. 2A is a second example 200 apparatus for sound signal detection. The second apparatus 200 includes: a first wireless device 202 having a first pressure sensor 204 and a first processing element 206; and a second wireless device 208 having a second pressure sensor 210 and a second processing element 212. Each pressure sensor 204, 210 captures acoustic energy 214 within a time window. The time window can be controlled by a clock signal synchronized between the devices 202, 208. Acoustic energy is herein defined to include gas pressure variations in an environment. A sound (e.g. audio) signal is herein defined as a specific type of acoustic energy, such as: a voice signal, a baby crying, a fire alarm, leaking water, broken glass, shots fired, etc. A voice signal is a special type of sound signal and is herein defined as a subset of sound signals which are equivalent to human speech or human-like (e.g. synthetic speech) speech sounds, such as a person's voice.

The wireless devices 202, 208 need not be the same in all example embodiments. In one example embodiment, the wireless devices 202, 208 could be two earbuds configured to be worn by a person. In another example embodiment, the wireless devices 202, 208 could be a smartwatch and a smartphone configured to be carried or worn by a person. In yet another example embodiment, the wireless devices could be two or more devices positioned at various locations in a conference room. The wireless devices 202, 208 thus could be: an earbud, a hearable, a smartphone, a smartwatch, a wearable device, a tablet, a computer, a wireless microphone, etc.

The second example 200 apparatus stores an acoustic profile for each of the wireless devices 202, 208. The acoustic profile, in one example embodiment, provides resonance and attenuation characteristics that are very specific to the wireless devices 202, 208, and in some examples may be specific to a just particular set of the wireless devices 202, 208. These acoustic profiles enable more accurate signal enhancements (e.g. beamforming) during later sound detection and processing steps. In other example embodiments one or more of the wireless device's acoustic profiles could be generic.

The first and second wireless devices 202, 208 are separated from each other by a predetermined distance. Predetermined distance in one example refers to a particular spatial placement of the wireless devices 202, 208 such that the wireless devices 202, 208 are separated by a fixed, or in other embodiments a known variable (e.g. periodic, equation, set of data points) distance. This predetermined distance can be within: a home, a car, an office, an indoor or outdoor environment, etc. If the pressure sensors 204, 210 (e.g. microphones) are further spatially separated, then sound signal enhancements (e.g. beamforming and/or noise reduction) enable more accurate sound signal identification by reducing ambient noise.

Beamforming (i.e. spatial filtering) in one example is a signal enhancement technique used in sensor arrays for directional signal transmission or reception. Beamforming is achieved by combining elements in a phased array in such a way that signals at particular angles experience constructive interference while others experience destructive interference. Beamforming is used to achieve spatial signal selectivity. Thus beamforming defines a particular geometry within a space containing acoustic energy, which excludes other geometries and create a very directional acoustic energy capture technique (e.g. targeting a specific front and center location wherein a person's mouth is likely to be located, using a set of wireless earbuds that are presumed to be worn on the person's ears. In other example embodiments, adaptive beamforming is used to zero in on a previously unknown location of a predefined sound target. Adaptive beamforming may first identify a specific acoustic profile and/or sound level, before removing other unwanted sounds (e.g. noise).

In one example embodiment, the pressure sensors 204, 210 are microphones. The pressure sensors 204, 210 can receive the acoustic energy 214 either internal to the wireless device 202, 208 or externally (see internal/external discussion above) through a passage coupling an internal portion of the wireless devices 202, 208 directly to an external ambient environment.

In various example embodiments, one or both processing elements 206, 212 are configured with a set of instructions for enabling sound signal detection. The order in which these example instructions are presented can be changed or selectively excluded in different example embodiments. Additionally, in some example embodiments certain instructions are implemented in parallel.

A first instruction 216 for receiving a first set of acoustic energy captured by the first pressure sensor 204 within the first wireless device 202 and within a time window.

A second instruction 218 for receiving a second set of acoustic energy captured by the second pressure sensor 210 within the second wireless device 208 and within the time window. The wireless devices 202, 208 can be configured to communicate and exchange data using near-field magnetic induction (NFMI) circuits and protocols.

The second set of acoustic energy transferred to the first wireless device 202 can be either a set of real-time acoustic energy 214, if the wireless connection between the wireless devices 202, 208 can be set up sufficiently rapidly, or a buffered version of the acoustic energy 214 to compensate for a delay in setting up the wireless link.

A third instruction 220 applies a beamforming and/or other signal enhancement techniques to the first and second sets of acoustic energy, based on the first and second acoustical profiles.

A fourth instruction 222 searches for a predefined sound signal within the signal enhanced (e.g. beamformed) sets of acoustic energy. Since the acoustic energy 214 can include noise, signal enhancement techniques such as beamforming are used to distinguish the noise from the predefined sound signal. The predefined sound signal can include: a voice command, an authorized voice signature, a baby crying, an environmental sound, a breaking glass sound, a dripping water sound, a fire alarm sound, a combustion sound, etc.

A fifth instruction 224 initiates a subsequent set of sound signal detection actions (e.g. instructions) if the search finds the predefined sound signal.

In some example embodiments, the second wireless device 208 includes a second processing element 212 having a set of instructions for enabling sound detection 225 which is similar to those in the first processing element 206.

Figure 2B:
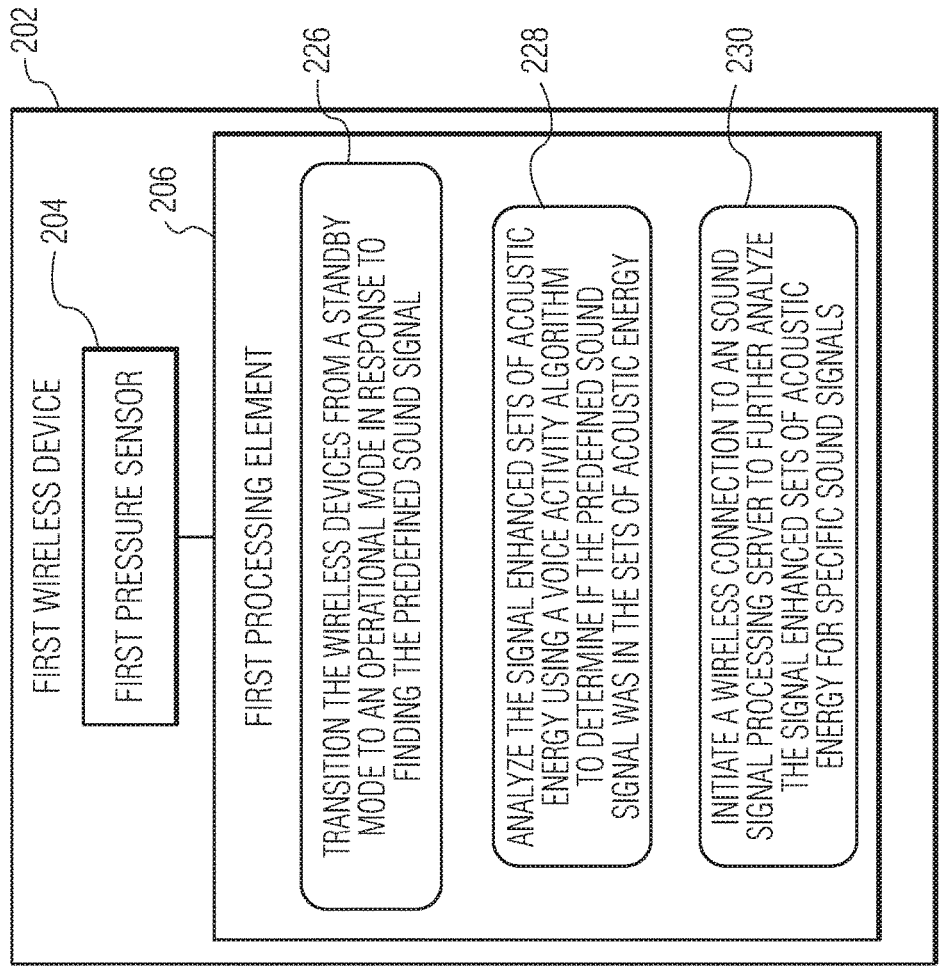
FIG. 2B is an example set of subsequent sound signal detection instructions for enabling sound signal detection.

FIG. 2B is an example set of subsequent sound signal detection instructions for enabling sound signal detection. In various example embodiments, one or both processing elements 206, 212 are configured with the set of subsequent sound signal detection instructions. The order in which these example instructions are presented can be changed or selectively excluded in different example embodiments. Additionally, in some example embodiments certain instructions are implemented in parallel.

A sixth instruction 226 transitions the wireless devices 202, 208 from a standby mode to an operational mode in response to finding the predefined sound signal.

An seventh instruction 228 analyzes the signal enhanced (e.g. beamformed) sets of acoustic energy using a voice activity algorithm to determine if the predefined sound signal was in the sets of acoustic energy. By removing "false alarms", the voice activity algorithm increases voice and sound signal detection accuracy.

A eighth instruction 230 initiates a wireless connection to an sound signal processing server to further analyze the signal enhanced sets of acoustic energy for specific sound signals, voice commands, words, sounds, or speech phrases, if the voice activity algorithm determines that the sets of acoustic energy included the predefined sound signal.

Wireless device 202, 208 connection to the sound signal processing server (e.g. voice signal processing server) in one example can be through a Bluetooth connection to a smartphone which then has either a WIFI or cellular connection to a remote voice signal processing server.

In the second example 200 apparatus for sound signal detection discussed in FIGS. 2A and 2B above, the wireless devices 202, 208 perform a double-sided (e.g. dual) sound signal detection, in comparison to the single-sided sound signal detection discussed in FIG. 1.

Also for embodiments where the pressure sensors 204, 210 are external microphones located on either side of a person's head, the beamforming and/or other signal enhancement processing substantially reduce any environmental noise interference so that predefined sound signal, such as human speech, voice commands, etc., can be more accurately understood (e.g. for speech recognition). Robustness to false predefined sound signal detections is increased compared to single-sided sound signal detection, due to the noise reduction and beamforming of the pressure sensors' 204, 210 (e.g. external microphones') signals.

One advantage of the double-sided microphone approach is that the computationally intensive speech recognition algorithms need only be designed to run on a signal enhanced (e.g. cleaned-up, beamformed etc.) combination of both pressure sensors 204, 210.

As mentioned above, the double-sided sound signal detection discussed herein can be extended to various smart-home, smart-car, smart-office, or smart-environment applications, detecting perhaps: fire alarms, glass breakage, baby cries, dripping water, structural failures, shots fired, and so on.

Figure 3:
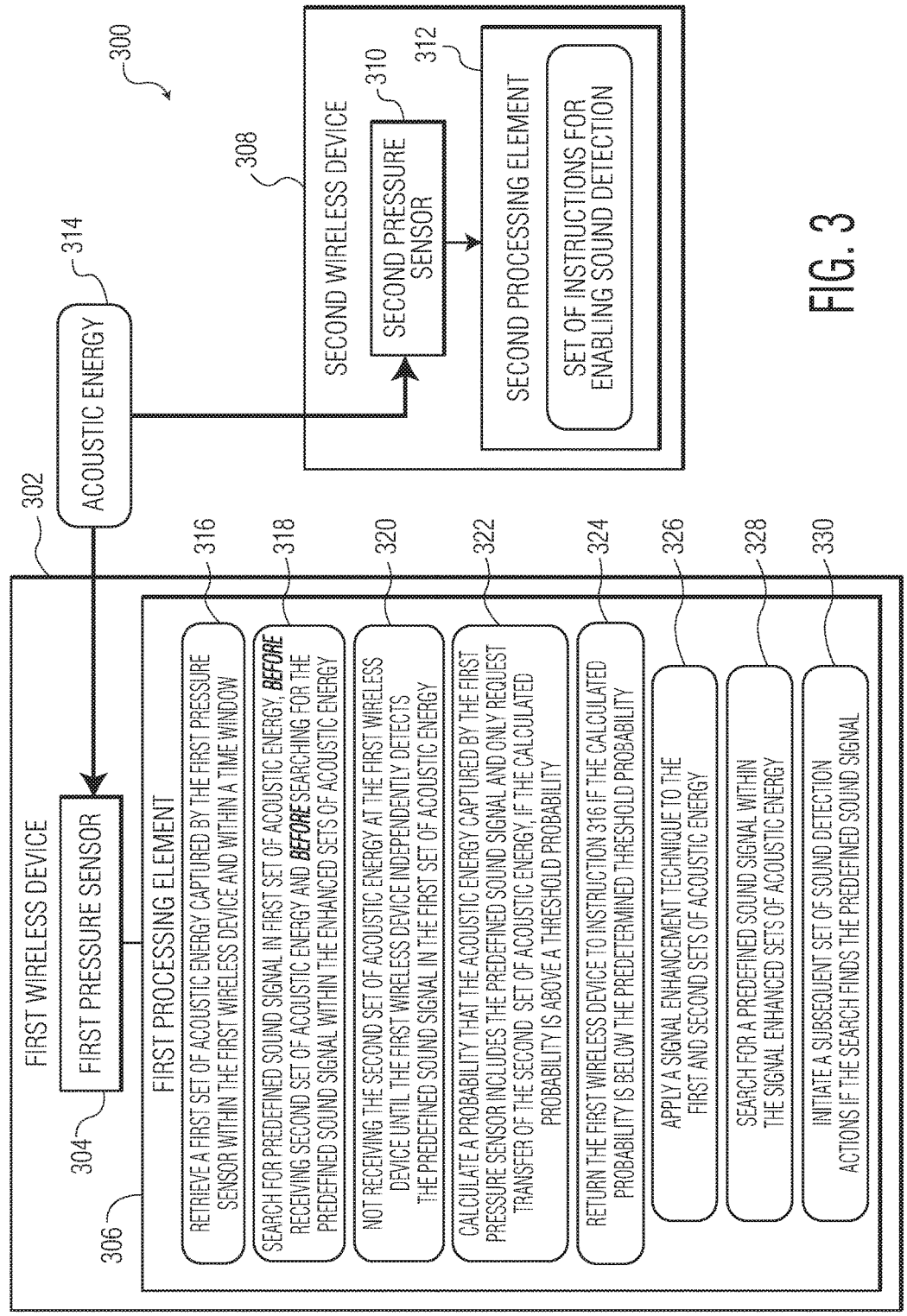
FIG. 3 is a third example apparatus for sound signal detection.

FIG. 3 is a third example 300 apparatus for sound signal detection. The third apparatus 300 includes: a first wireless device 302 having a first pressure sensor 304 and a first processing element 306; and a second wireless device 308 having a second pressure sensor 310 and a second processing element 312. Each pressure sensor 304, 310 captures acoustic energy 314 within a time window. The time window can be controlled by a clock signal synchronized between the devices 302, 308.

The third apparatus 300 however presents a modified version of the second example 200 apparatus (discussed above) which reduces the wireless devices' 302, 308 power consumption by canceling the second example 200 apparatus' instructions 218 through 232 (i.e. see the FIGS. 2A and 2B) and returning to the acoustic energy 314 capture mode (e.g. instruction 216) in certain circumstances.

In various example embodiments, one or both of the processing elements 306, 312 are configured with a set of instructions for enabling sound signal detection. The order in which these example instructions are presented can be changed or selectively excluded in different example embodiments. Additionally, in some example embodiments certain instructions are implemented in parallel.

A first instruction 316 retrieves a first set of acoustic energy captured by the first pressure sensor 304 within the first wireless device 302 and within a time window.

A second instruction 318 searches for the predefined sound signal in the first set of acoustic energy, before receiving the second set of acoustic energy and before searching for the predefined sound signal within the enhanced sets of acoustic energy.

A third instruction 320 for not receiving the second set of acoustic energy at the first wireless device 302 until the first wireless device 302 independently detects the predefined sound signal in the first set of acoustic energy, after which the first wireless device 302 is configured to request transfer of the second set of acoustic energy.

A fourth instruction 322 calculates a probability that the acoustic energy 314 captured by the first pressure sensor 304 includes the predefined sound signal and only requests transfer of a second set of acoustic energy captured by the second pressure sensor 310 within the second wireless device 308 and within the time window, if the calculated probability is above a predetermined threshold probability. This instruction reduces power consumption for the wireless devices 302, 308 since the devices 302, 308 do not always need to be in communication and exchange data.

A fifth instruction 324 returns the first wireless device 302 to instruction 316 if the calculated probability is below the predetermined threshold probability.

A sixth instruction 326 applies a beamforming and/or other signal enhancement techniques to the first and second sets of acoustic energy.

A seventh instruction 328 searches for a predefined sound signal within the signal enhanced sets of acoustic energy. Since the acoustic energy 314 can include noise, the signal enhancement (e.g. beamforming) techniques are used to distinguish the noise from the predefined sound signal.

A eighth instruction 330 initiates a subsequent set of sound signal detection actions (e.g. instructions) if the search finds the predefined sound signal.

Thus power consumption is the third example 300 apparatus is reduced since the second set of acoustic energy captured by the second pressure sensor 310 within the second wireless device 308 is not always transferred to the first wireless device 302.

In one example embodiment, both wireless devices 302, 308 (e.g. left and right earbuds) are in a single-sided voice activation mode and receive the acoustic energy 314 independently on their own pressure sensor 304, 310 (e.g. external microphone), and each wireless device 302, 308 individually calculates a probability that the acoustic energy 314 contains the predefined sound signal (e.g. voice activity from an authorized user). In this example either wireless device 302, 308 can set up a wireless connection (e.g. perhaps using NFMI) and initiate the request to transfer the other wireless devices' set of captured acoustic energy.

The subsequent sound signal detection instructions in the sixth instruction 326 can, in various example embodiments, include one or more of the instructions 226 through 232 discussed in FIG. 2A.

In various example embodiments, the wireless devices 202, 208 can communicate using a variety of protocols, including Bluetooth Classic (BC), Bluetooth Low-Energy (BLE), WiFi or NFMI.

Also, the various instructions here presented need not all be implemented on just the wireless devices 202, 208. Alternatively, such instructions could be executed by transferring the requisite acoustic and/or other data to a third device or to a server for processing. Such embodiments would tend to induce latency which may or may not be acceptable, depending upon a particular example embodiment.

Note that the instructions and/or flowchart steps in the above Figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

Figure 4:
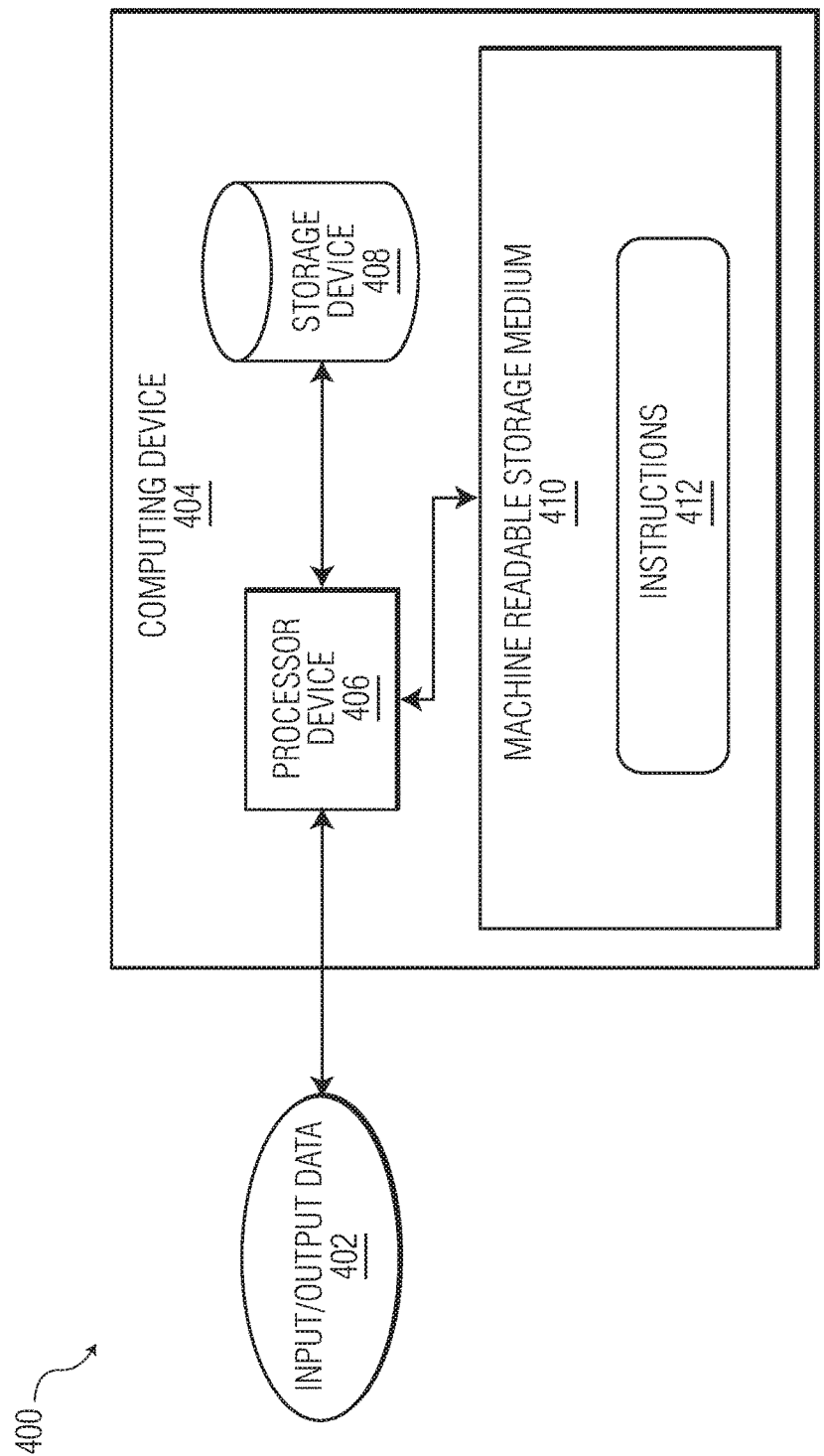
FIG. 4 is an example system for hosting the instructions within either the second or third apparatus for sound signal detection.

FIG. 4 is an example system for hosting the instructions within either the second or third apparatus for sound signal detection. The system 400 shows an input/output data 402 interface with an electronic apparatus 404. The electronic apparatus 404 includes a processor 406, a storage device 408, and a non-transient machine-readable storage medium 410. The machine-readable storage medium 410 includes instructions 412 which control how the processor 406 receives input data 402 and transforms the input data into output data 402, using data within the storage device 408. Example instructions 412 stored in the machine-readable storage medium 410 are discussed elsewhere in this specification. The machine-readable storage medium in an alternate example embodiment is a non-transient computer-readable storage medium.

The processor (such as a central processing unit, CPU, microprocessor, application-specific integrated circuit (ASIC), etc.) controls the overall operation of the storage device (such as random access memory (RAM) for temporary data storage, read only memory (ROM) for permanent data storage, firmware, flash memory, external and internal hard-disk drives, and the like). The processor device communicates with the storage device and non-transient machine-readable storage medium using a bus and performs operations and tasks that implement one or more instructions stored in the machine-readable storage medium. The machine-readable storage medium in an alternate example embodiment is a computer-readable storage medium.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In this specification, example embodiments have been presented in terms of a selected set of details. However, a person of ordinary skill in the art would understand that many other example embodiments may be practiced which include a different selected set of these details. It is intended that the following claims cover all possible example embodiments.

What is claimed is:

1. Apparatus for sound signal detection, comprising:
a first wireless device including a first pressure sensor having a first acoustical profile and configured to capture a first set of acoustic energy within a time window;
wherein the first wireless device includes a wireless signal input;
wherein the first wireless device is not connected to the second wireless device;
wherein the first wireless device includes a processing element configured to:
set up a connection between the first wireless device and a second wireless device only when a trigger is observed in a sound signal received by the first wireless device and second wireless device;
request and receive through the wireless signal input, a second set of acoustic energy captured by a second pressure sensor, corresponding to the sound signal, having a second acoustical profile, within the second wireless device and within the time window when the trigger is observed;
apply a signal enhancement technique to the first and second sets of acoustic energy based on the first and second acoustical profiles;
search for a predefined sound signal within the enhanced sets of acoustic energy;
initiate a subsequent set of sound signal detection actions if the search finds the sound signal; and
search for the predefined sound signal in the first set of acoustic energy, before receiving the second set of acoustic energy and before searching for the predefined sound signal within the enhanced sets of acoustic energy;
request transfer of the second set of acoustic energy in response to the processing element detecting the predefined sound signal in the first set of acoustic energy; and
calculate a probability that the first set of acoustic energy received within the time window includes the predefined sound signal and only requests transfer of the second set of acoustic energy if the calculated probability is above a predetermined threshold probability; and
wherein the second set of acoustic energy is not received until the first wireless device requests transfer of the second set of acoustic energy.

2. The apparatus of claim 1:
wherein a voice activity algorithm enables the search for the predefined sound signal.

3. The apparatus of claim 1:
wherein the predefined sound signal includes at least one of: a voice command, an authorized voice signature, child crying, an environmental sound, a breaking glass sound, a dripping water sound, a fire alarm sound or a combustion sound.

4. The apparatus of claim 1, further comprising:
the second wireless device, wherein the second wireless device is configured to be separated from the first wireless device by a predetermined distance.

5. The apparatus of claim 4:
wherein the set of wireless devices are configured to be separated by the predetermined distance within at least one of: an indoor environment, a home, an office, a subway, a vehicle, a car, a train, a plane, or an outdoor environment.

6. The apparatus of claim 1:
wherein the first wireless device is configured to receive the second set of acoustic energy encoded within a near-field magnetic induction (NFMI) signal.

7. The apparatus of claim 1:
wherein the wireless devices include at least one of: a microphone, an earbud, a hearable, a smartphone, a smartwatch, a wearable device, a tablet or a computer.

8. The apparatus of claim 1:
wherein the set of sound signal detected actions include transitioning the wireless device from a standby mode to an operational mode in response to finding the predefined sound signal.

9. The apparatus of claim 1:
wherein the set of sound signal detected actions further include, if the signal enhanced sets of acoustic energy included the predefined sound signal, then initiating a wireless connection to a sound signal processing server to further analyze the signal enhanced sets of acoustic energy for specific sound signals, voice commands, words, sounds, or speech phrases.

10. The apparatus of claim 1:
wherein the first pressure sensor is configured to receive the acoustic energy via a passage coupling an internal portion of the wireless device to an external ambient environment.

11. The apparatus of claim 1:
wherein the signal enhancement technique is a beamforming technique; and
wherein the acoustic energy includes noise and the beamforming technique distinguishes the noise from the sound signal.

12. Apparatus for sound signal detection, comprising:
a first wireless device including a first pressure sensor configured to capture a first set of acoustic energy within a time window;
a second wireless device including a second pressure sensor configured to capture a second set of acoustic energy within the time window; and
a third wireless device including a processing element configured to:
set up a connection between the first wireless device, the second wireless device and the third wireless device only when a trigger is observed in a sound signal received by the first wireless device and second wireless device;
request transfer of the first set of acoustic energy captured by the first pressure sensor within the first wireless device and within the time window when the trigger is observed;
request and receive transfer of the second set of acoustic energy captured by the second pressure sensor, corresponding to the sound signal, within the second wireless device and within the time window when the trigger is observed;
apply a signal enhancement technique to the first and second sets of acoustic energy;
search for a predefined sound signal within the signal enhanced sets of acoustic energy; and
initiate a set of sound signal detected actions if the search finds the predefined sound signal,
search for the predefined sound signal in the first set of acoustic energy, before receiving the second set of acoustic energy and before searching for the predefined sound signal within the enhanced sets of acoustic energy;
request transfer of the second set of acoustic energy in response to the processing element detecting the predefined sound signal in the first set of acoustic energy; and
calculate a probability that the first set of acoustic energy received within the time window includes the predefined sound signal and only requests transfer of the second set of acoustic energy if the calculated probability is above a predetermined threshold probability;
wherein the second set of acoustic energy is not received until the first wireless device requests transfer of the second set of acoustic energy; and
wherein the first wireless device is not connected to the second wireless device.

13. An article of manufacture including at least one non-transitory, tangible machine readable storage medium containing executable machine instructions for sound signal detection:
wherein the article includes,
a first wireless device including a pressure sensor, having a first acoustical profile, and configured to capture a first set of acoustic energy within a time window, and a processing element configured to execute the instructions; and
wherein the first wireless device is not connected to a second wireless device,
wherein the instructions include,
setting up a connection between the first wireless device and a second wireless device only when a trigger is observed in a sound signal received by the first wireless device and second wireless device;
requesting and receiving through the wireless signal input, a second set of acoustic energy captured by a second pressure sensor, corresponding to the sound signal, having a second acoustical profile, within the second wireless device and within the time window when the trigger is observed;
applying a signal enhancement technique to the first and second sets of acoustic energy based on the first and second acoustical profiles;
search for a predefined sound signal within the enhanced sets of acoustic energy; and
initiate a subsequent set of sound signal detection actions if the search finds the sound signal; and
search for the predefined sound signal in the first set of acoustic energy, before receiving the second set of acoustic energy and before searching for the predefined sound signal within the enhanced sets of acoustic energy;
request transfer of the second set of acoustic energy in response to the processing element detecting the predefined sound signal in the first set of acoustic energy; and
calculate a probability that the first set of acoustic energy received within the time window includes the predefined sound signal and only requests transfer of the second set of acoustic energy if the calculated probability is above a predetermined threshold probability; and
wherein the second set of acoustic energy is not received until the first wireless device requests transfer of the second set of acoustic energy.

* * * * *